United States Patent [19]
Gray

[11] 3,807,272
[45] Apr. 30, 1974

[54] APPARATUS FOR FORMING ROCKET MOTORS

[75] Inventor: Edward Ray Gray, Loomis, Calif.

[73] Assignee: Aerojet-General Corporation, El Monte, Calif.

[22] Filed: Jan. 25, 1972

[21] Appl. No.: 220,610

[52] U.S. Cl. ..................................... 86/1, 264/3 R
[51] Int. Cl. ........................................... C06b 21/02
[58] Field of Search ............... 264/3 R; 86/1, 20, 23

[56] References Cited
UNITED STATES PATENTS

| | | | |
|---|---|---|---|
| 2,916,776 | 12/1959 | O'Neill et al. | 264/3 R |
| 2,936,669 | 5/1960 | Douglass | 86/20 R |
| 2,939,176 | 6/1960 | Adelman | 264/3 R |
| 2,970,898 | 2/1961 | Fox | 264/3 R |
| 3,246,053 | 4/1966 | Kuntz et al. | 264/3 R |
| 3,252,369 | 5/1966 | Bartley et al. | 264/3 R |

*Primary Examiner*—Stephen J. Lechert, Jr.
*Attorney, Agent, or Firm*—Mark C. Jacobs

[57] ABSTRACT

Apparatus and method are disclosed for forming rocket motors or the like by mounting a plurality of hollow rocket chambers on a rotary turntable, then filling the chambers under vacuum with a solidifiable rocket propellant slurry. Bores are formed in the slurry in each chamber by inserting core rods therein before the slurry solidifies. After the slurry is cured, the core rods are removed and the chambers are provided with suitable means for completing them into rocket motors.

9 Claims, 12 Drawing Figures

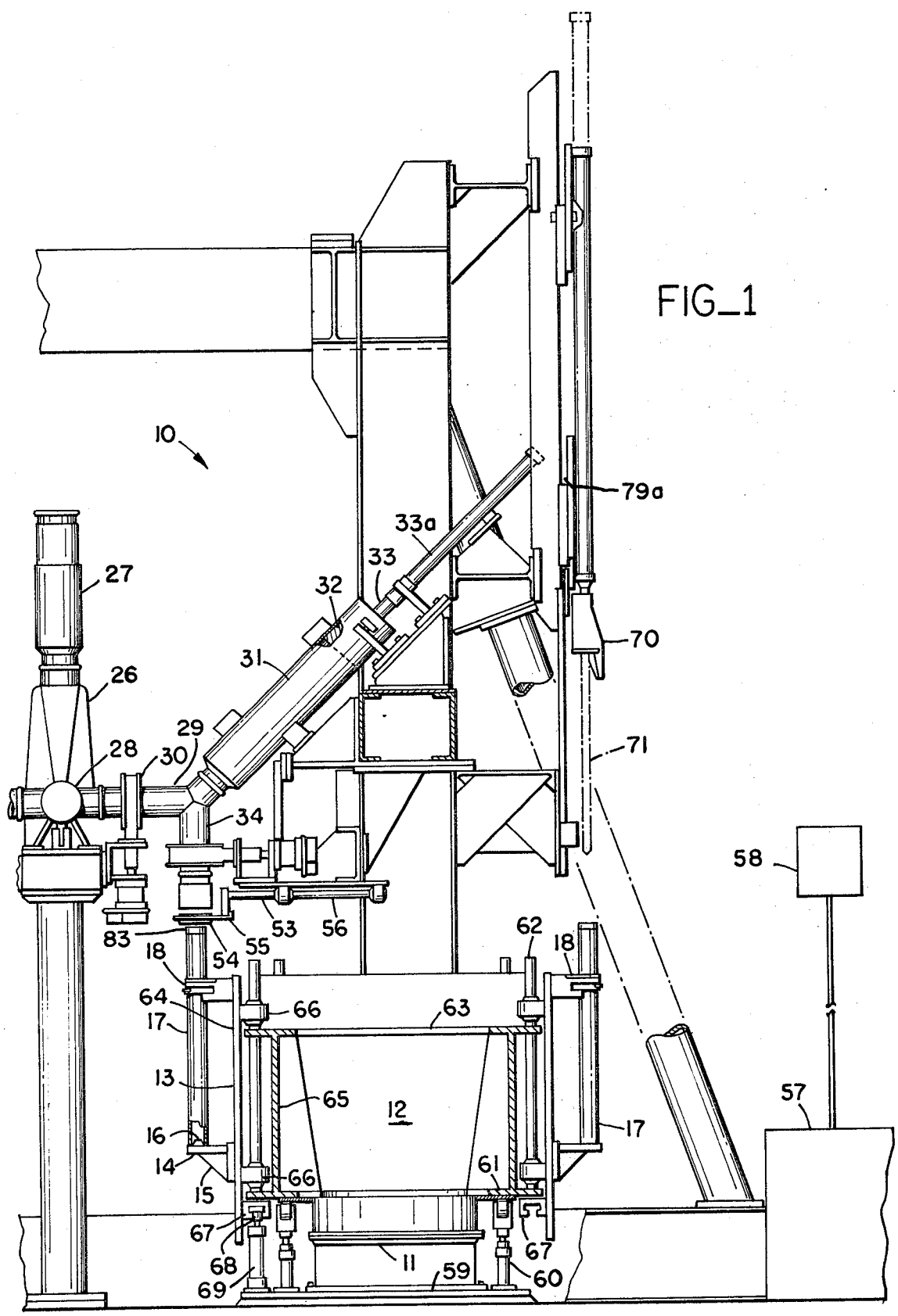
FIG_1

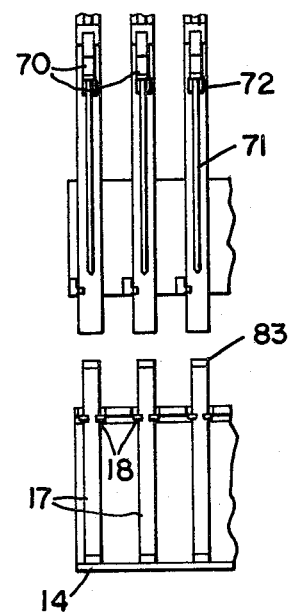
FIG_2
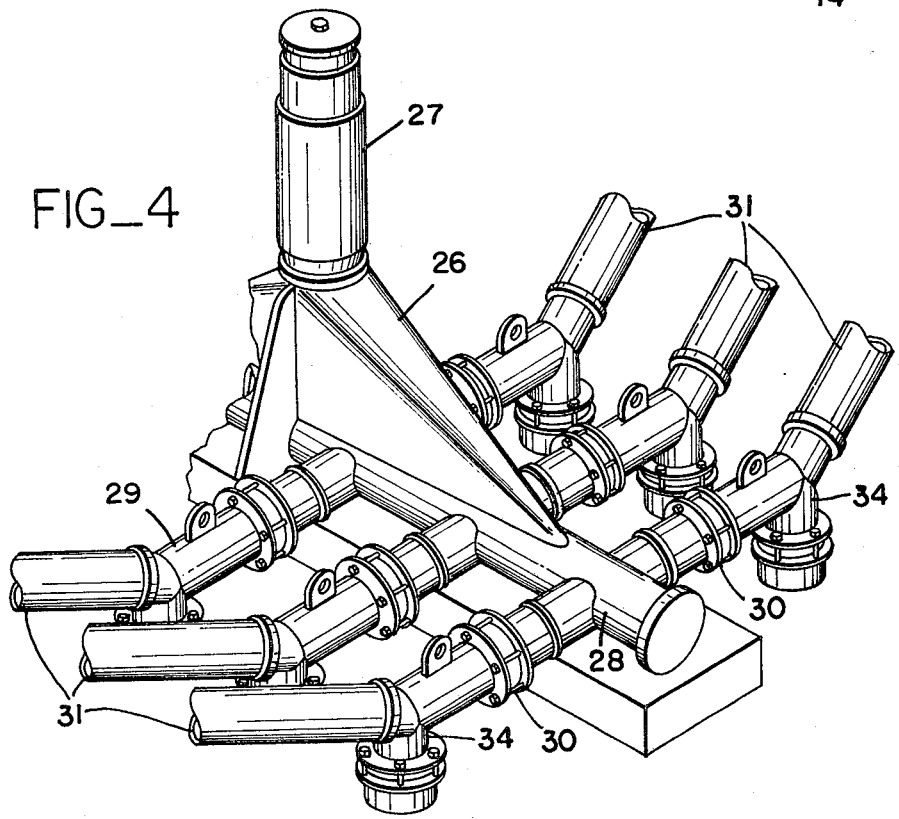
FIG_4
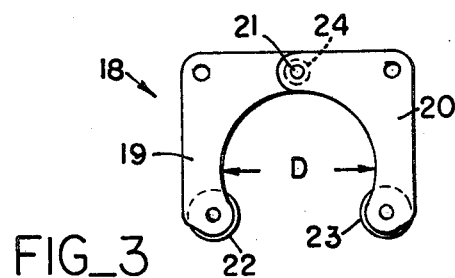
FIG_3

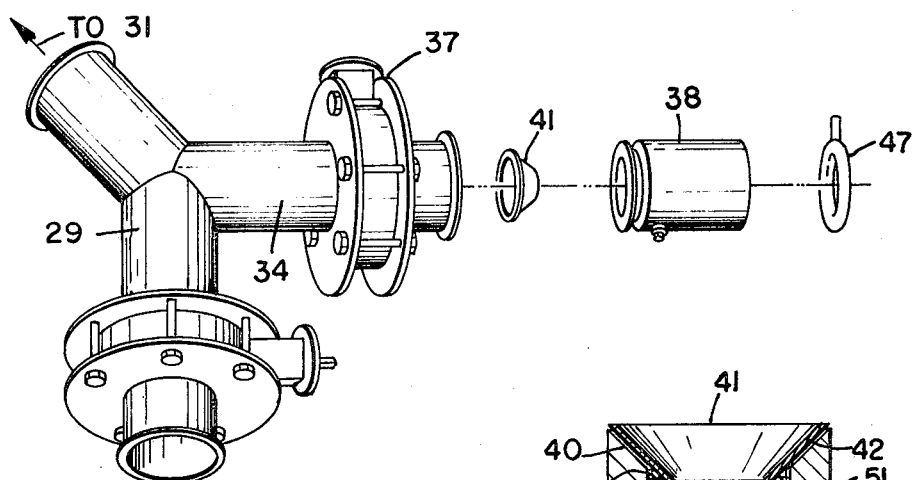
FIG_5
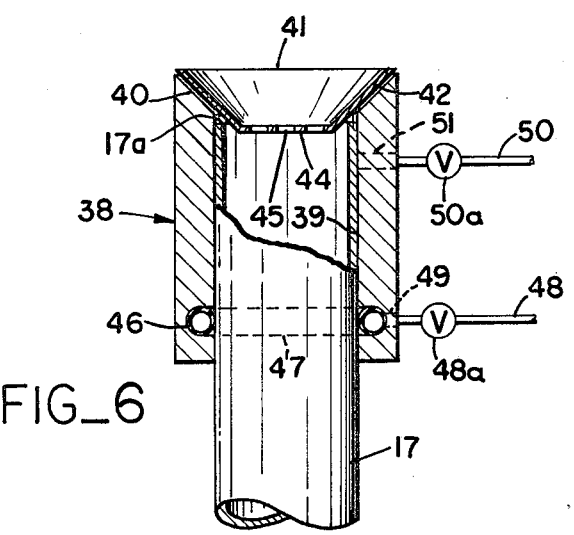
FIG_6
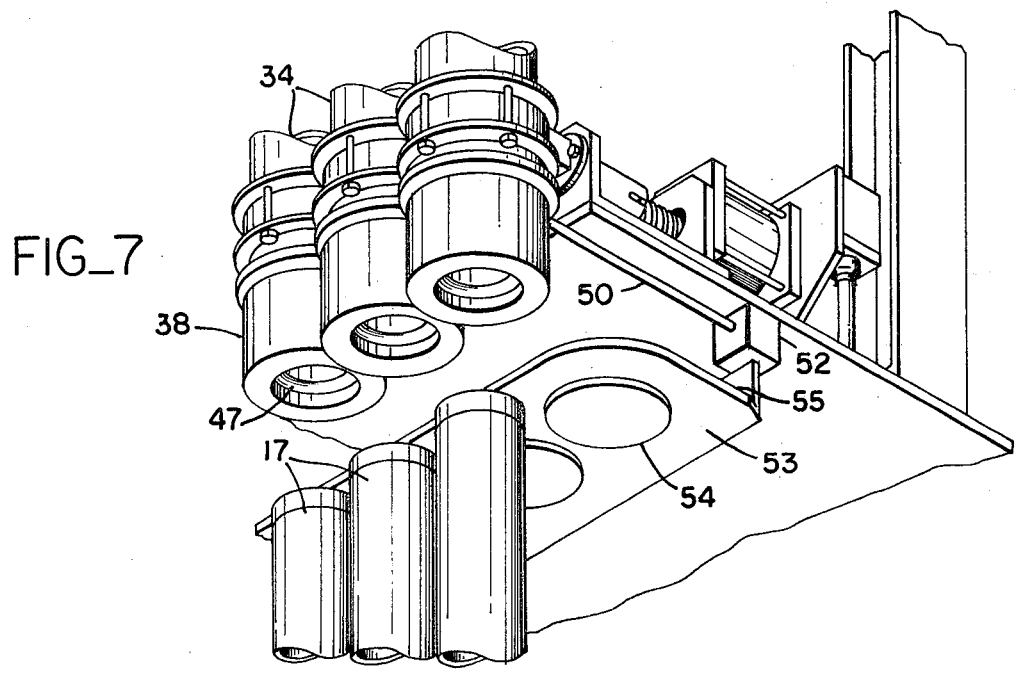
FIG_7

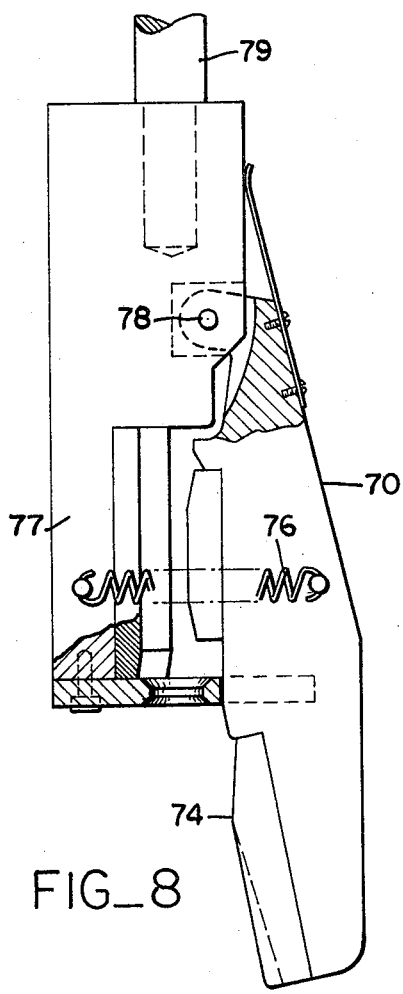
FIG_8
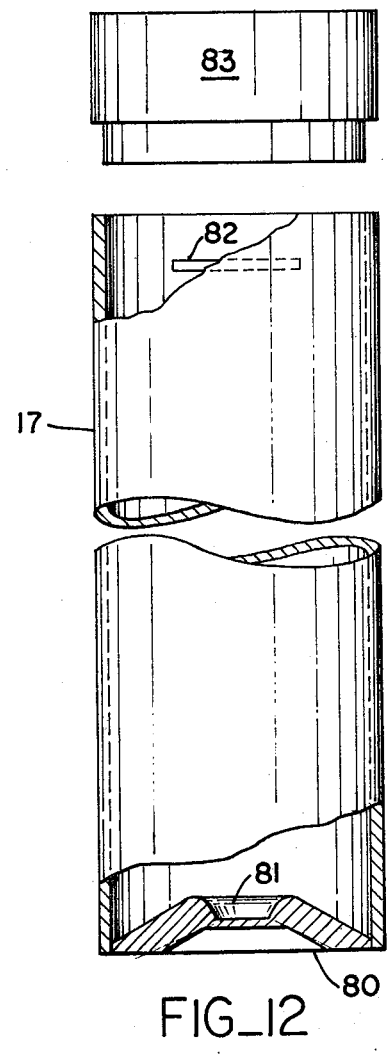
FIG_12
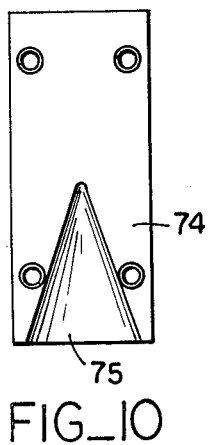
FIG_10
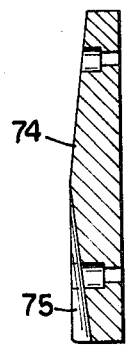
FIG_11
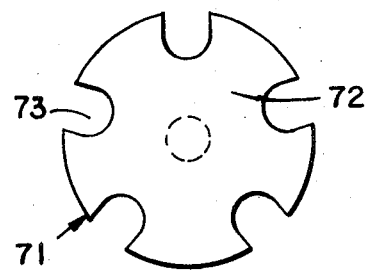
FIG_9

APPARATUS FOR FORMING ROCKET MOTORS

BACKGROUND OF THE INVENTION

1. Field of the Invention

The invention relates to rocket motors; and, more particularly, to an improved method and apparatus for forming rocket motors in a quick, efficient manner.

2. Description of the Prior Art

As a general rule, solid propellant rocket motors are made by filling rocket chambers with a propellant which solidifies in situ. The chambers are then provided with suitable warheads, fins, etc., to convert them into rocket motors. Known methods and apparatuses for accomplishing this are time-consuming and not as efficient as desired. This is because many operations must be carried out manually, involving a large amount of manpower. Also, the solidified propellant in the rocket motors must be free of air bubbles and air gaps or the like so that it will burn efficiently. Further, a central bore may optionally be provided for obtaining proper burning patterns in certain rocket configurations.

It is clear from the foregoing that an improved method and apparatus is desirable to produce a significant amount of such rocket motors in a reasonable time with as little manpower as possible. Thus, such an operation should be as automatic as possible. Finally, the rocket motors produced in such an improved system should burn efficiently with as little defects as possible.

Summary of the Invention

It is an object of this invention to provide an improved method and apparatus for forming solid propellant-containing rocket motors.

It is a further object of this invention to provide such a system that is as automatic as possible, thus requiring little in manpower and producing a significant amount of rockets in as short a time as possible.

It is a still further object of this invention to provide such a system which results in the formation of rocket motors having bored, relatively air-free solidified rocket propellants therein.

These and other objects are preferably accomplished by mounting a plurality of hollow rocket chambers on a rotary turntable, then filling the chambers under vacuum with a solidifiable rocket propellant slurry. Bores may be formed, if desired, in the slurry in each chamber by inserting core rods therein before the slurry solidifies or the core rods may be inserted prior to the pouring of the slurry. After the slurry is cured, the core rods are removed and the chambers are provided with suitable means, such as warheads, fins, etc., for converting them into rocket motors.

BRIEF DESCRIPTION OF THE DRAWINGS

FIG. 1 is a vertical, partly sectional, view of apparatus for forming rocket motors in accordance with my invention;

FIG. 2 is a side view of a portion of the apparatus of FIG. 1;

FIG. 3 is a plan view of a clamp used on the apparatus of FIG. 1;

FIG. 4 is a top plan view of a portion of the apparatus of FIG. 1;

FIG. 5 is an exploded view of a portion of the apparatus of FIG. 1, rotated 90° for convenience of illustration;

FIG. 6 is a vertical sectional view of a portion of the apparatus of FIG. 5 showing parts thereof in operating position;

FIG. 7 is a perspective view of a portion of the apparatus of FIG. 1;

FIG. 8 is a vertical, partly sectional view, of a portion of the apparatus of FIGS. 1 and 2;

FIG. 9 is a top plan view of a core rod held by the apparatus of FIG. 8;

FIG. 10 is a bottom plan view and FIG. 11 is a side sectional view of a portion of the apparatus of FIG. 8; and FIG. 12 is a vertical sectional view of a rocket chamber prior to the completion thereof in accordance with the teachings of my invention.

DESCRIPTION OF THE PREFERRED EMBODIMENT

Referring to FIG. 1 of the drawing, a system 10 is shown for carrying out my invention. The system 10 includes a rotatable turntable 11 which carries for rotation an upper table 12. Table 12 may be generally square in cross section, although any suitable configuration may be used.

A plurality of chamber-retaining stations 13 are provided about the periphery of table 12. The particular number and spacing of such stations is a matter of choice; however, the size of the table, the size of the chambers, as will be explained further hereinbelow, etc., would enter into such determination. Of course, the larger the number of stations, the more rocket motors that can be manufactured in accordance with my invention.

At any rate, table 12 includes a peripheral ledge 14, which may be braced by suitable flanges 15, having a plurality of spaced chamber-centering members 16 thereon, such as inverted indented cones or the like (see FIG. 1 — member 16 is indented on its upper surface for reasons to be discussed further hereinbelow) which conform to depressions on the undersurface of chambers 17.

Means are also provided for releasably engaging the chambers 17 at a point above ledge 14. Such means may include resiliently biased pivotably mounted clamps 18 shown in plan view in FIG. 3. Clamps 18 are comprised of a pair of generally L-shaped member 19 and 20 pivotally connected at a common point 21. Rollers 22, 23 may be mounted on the free ends of members 19 and 20, respectively, to assist in placing and removing chambers 17 in and from clamp 18. As can be seen, the inner diameter D of clamp 18 conforms generally to the outer diameter of chambers 17. Finally, any suitable means may be provided for resiliently biasing members 19, 20, as for example, conventional springs 24 associated with both members 19, 20 at the point of connection 21 and resiliently biasing members 19, 20 in a chamber-grasping position.

In this manner, chambers 17 may be quickly and easily loaded onto table 12 by centering the depression in the base thereof onto members 16 and locking the chambers 17 in clamps 18 as clearly seen in FIG. 1. Thus, clamps 18 serve as retaining members for chambers 17. The clamps 18, table 12, ledge 14 and member 16 complete the stations 13 for receiving chambers 17.

The chambers 17, once in position, are vertically disposed with their upper ends open for receiving a solidifiable rocket propellant slurry from manifold system 26.

Manifold system 26 can best be seen in FIG. 4 and includes a centrally located slip tube 27 for connection to a suitable source of the propellant slurry (not shown). Slip tube 27 is in fluid communication with a manifold 28 having a plurality of pipe sections 29 branching off generally horizontally therefrom. A fill valve 30 is in fluid communication with each pipe section 29. As can be seen in both FIGS. 1 and 4, volumetric cylinders 31 may branch off upwardly and outwardly at an angle from sections 29, as clearly seen in FIG. 1. Free-floating pistons 32, activated upwardly and outwardly by the force of the moving propellant (see FIG. 1), which may include suitable O-rings (not shown) or the like to prevent liquid bypass, are associated with each volumetric cylinder 31. Hydraulic cylinders 33a, which include internal rods 33, are shown in FIG. 1 external of cylinder 31. These rods 33, activated by cylinders 32a, will, as will be discussed hereinbelow, push down on the pistons 32 in cylinders 31 to thereby push the propellant into chambers 17. The degree of extension and retraction of the rods 33 of cylinders 32 a may be controlled by suitable magnetic switches, if desired.

Vertical pipe sections 34 branch off each intersection of cylinders 31 with pipe sections 29 and are also in fluid communication therewith. This can be seen more clearly in FIG. 5.

Cast valves 37 are then provided on the lower open ends of sections 34. Finally, cast heads 38 are connected to valves 37 and are open at the bottom. Thus, as can be seen in FIG. 6, cast head 38 preferably is machined internally to provide a central bore 39 which is related to the outside diameter of chambers 17. The upper portion of bore 39 is cone-shaped, as at 40, to provide a seat for funnel 41. Funnel 41, as can also be seen in FIG. 5, is generally of a suitable metal and includes a main cone-like body portion 42 terminating at its lower end in a generally circular perforated plate 44. The perforations 45 therein are of a configuration to form thread-like elongated strands of the propellant slurry to assist in both the elimination of air from the propellant slurry and in the reunion of the propellant within the chambers 17 by stopping bridging of portions thereof. Bridging is the term used to refer to the formation of gaps or voids between the inner chamber wall and the propellant slurry or between portions of the propellant slurry itself where it doesn't congeal — a congealing action is desired to avoid such air gaps or the like.

An annular groove 46 is formed about the lower portion of the inner wall of bore 39. A hollow, generally ring-shaped inflatable bladder 47 is preferably disposed in groove 46; bladder 47 includes an air line 48 controlled by a conventional three-way valve 48a in fluid communication therewith passing out of head 38 through a suitable aperture 49 therein and leading to both a source of pressurized air (not shown) and an outlet therefor. By inflating bladder 47 with pressurized air when chamber 17 is disposed inside of head 38, bladder 47 forms a seal between the chamber 17 and the inner wall of head 38. Of course, the bladder 47 can be deflated by releasing the air.

Vacuum outlets 50, controlled by suitable valves 50a, communicate with the interior of the heads 38 below plates 44 via apertures 51. Outlets 50 are coupled to conventional slurry accumulators 52 to assist in the forming of a vacuum within heads 38 and the interior of chambers 17. As can also be seen in FIG. 7, a drip tray assembly 53 may be associated with table 12. Assembly 53 includes a plurality of removable drip trays 54 disposed in suitable apertures in plate 55 of assembly 53. As can be seen by comparing FIGS. 1 and 7, plate 55 is movable between a position whereby trays 54 are aligned with the lower open ends of heads 38 (FIG. 1) and a position out of dripping engagement therewith (FIG. 7) after completion of casing. Suitable hydraulically actuated arms 56 may be coupled to plate 55 to accomplish this.

Further, in addition to turntable 11 being rotatable by means of any suitable motive means, such as motor 57, and controlled remotely at panel 58, entire table 12, or one or more of a plurality of the stations 13, may be moved vertically upwardly and downwardly by any suitable means. For example, turntable 11 may be mounted on a base plate 59 by stationary or movable support means as by having a plurality of suitably spaced hydraulically activated cylinders 60 operatively connected to the lower wall 61 of table 12 (FIG. 1). Alternatively, a plurality of rods 62 or the like, as for example, one disposed at each corner of lower wall 61 of table 12, may be provided supported at their upper ends by passing through (and being retained in) suitable apertures in upper wall 63 of table 12. The clamps 18 and centering members 16 are disposed on side walls 64, which include a plurality of stations 13, spaced from the inner peripheral wall 65 of table 12. These side walls 64 include spaced sleeve members 66 which surround rods 62 (and are slidably movable thereon), as clearly shown in FIG. 1. The lower portion of walls 64, below the lower wall 61 of table 12, further include integral bracket members 67 operatively engaging and retaining therein the movable piston head 68 of hydraulically activated cylinders 69 also mounted on base plate 59. It can be seen by comparing the two bracket members 67 that are visible in FIG. 1 that the piston head 68 may easily move into and out of engagement therewith upon rotation of table 12. Suitable connections (not shown) are provided between all the cylinders 60, 69 and motor 57 and control panel 58 for activating the cylinders to raise and lower both table 12 and walls 64 independently thereof.

As will be explained further hereinbelow, it is often desired to form bores within the cylinders 17 before or after they are filled with the solidifiable propellant slurry, but before the slurry solidifies, i.e., is cured. This is accomplished by providing a plurality of spaced core rod holders 70, one of which is shown in detail in FIG. 8. These core rod holders 70 (FIGS. 1 and 2) are spaced identical to the distance between stations 13, that is, the core rods 71 retained thereby are vertically aligned with the center of the chambers 17 when table 12 is rotated to bring chambers 17 directly underneath rods 71. Core rods 71 are generally cylindrical and of generally uniform diameter throughout for forming cylindrical bores as will be discussed further hereinbelow.

The upper portions or heads 72 of rods 71 may be conveniently configured as shown in FIGS. 2 and 9. That is, heads 72 are generally cylindrical with circumferential grooves 73 extending about the periphery thereof for reasons to be discussed further hereinbelow. This configuration, however, raises problems in retaining rods 71 in a position of alignment with chambers 17. Thus, referring back to FIG. 8 and also with reference to FIGS. 10 and 11, core rod holders 70 include head members 74 notched, as at V-shaped notch 75, for retaining and holding therein the grooved heads 72 of core rods 71. As can be seen in FIG. 11, notch 75 is shallow and does not extend all the way through head member 74. Also, as can be seen in FIG. 2, head member 74 retains the head 72 of a core rod 71 in place.

Referring once again to FIG. 8, a suitable spring 76 or the like, connected to both members 74 and plate 77, may be provided to bias head members 74 in a core rod holding position. Members 74 are pivotally mounted to plates 77, as at pivot point 78, and plates 77 are hydraulically activated by means of hydraulic cylinders 79 in fluid communication therewith by means well known in the art. Plates 77 are independent of movement of table 12 and the entire apparatus is slidably movable along members 79a (FIG. 1). Thus, by suitable connection of cylinders 79 to motor 57 and control panel 58, the entire apparatus, i.e., cylinders 79, plates 77 and holders 70, may be selectively moved upwardly and downwardly on members 79a with core rods 71 carried by core rod holders 70 entering chambers 17.

Although I have used the term "motor" and "control panel", such terms are used broadly to include all conventional wires, valves, hydraulic cylinders, switches, guages, operating buttons, sources of fluid for the various cylinders, etc., for carrying out the invention. The chambers 17 to be filled in accordance with my invention may be, as discussed previously, any suitable diameter or general configuration in conformity with the disclosure herein.

A suitable chamber 17, prior to the filling thereof, is illustrated in FIG. 12. Chamber 17 is preferably internally insulated and is of a suitable metal, such as aluminum or the like, generally cylindrical and open at its upper end. The bottom wall 80 is configured to fit snugly on centering members 16 on ledge 14 and includes an alignment means, such as a depression 81 for receiving therein the lower end of core rod 71. A slot 82, or other adaptation, is fixed thereto or otherwise provided in the cylindrical wall of chamber 17 below the top thereof for receiving an attachment means, such as a lock wire from a rocket exit nozzle which would subsequently be placed on the completed rocket motor. A removable generally cylindrical sleeve member 83, which may be of a suitable plastic or the like, may be press-fitted or otherwise attached into chamber 17 prior to filling the chamber 17 through member 83 (see also FIGS. 1 and 2 wherein members 83 are shown in place on chambers 17).

OPERATION

In operation, a source of propellant slurry is placed in a fluid-tight manner in fluid communication with the slip tube 27 of the manifold system 26. Chambers 17 are manually placed onto ledge 14 and clamps 18 of table 12 with the chamber bottom walls 80 snugly fitting over centering members 16 which vertically aligns the chambers 17. Chambers 17 include at this point their removable sleeve members 83. Also, the stations 13 are located before the cast heads 38 by means of the rotation of table 12. System 10 may at this time be checked to assure a vacuum seal of all the component parts. This may be accomplished by inserting blank plugs in the open ends of all of the cast heads 38, then opening both the fill valves 30 and the cast valves 37. After a no-leak condition is reached, the vacuum is maintained and fill valves 30 are closed. The source of the propellant slurry, which may also be valve-controlled, is actuated to fill manifold system 26 with the propellant slurry.

At the same time a vacuum condition is being maintained in the cast heads 38, it is also being maintained in the volumetric fill areas encompassed by cylinders 31, pistons 32 and rods 33. Of course, valve-controlled vacuum outlets 50, accumulators 52, etc., may be used to obtain and maintain the vacuum, as is well known in the art.

The cast valves 37 are now closed and the fill valves 30 are opened, thus filling the volumetric cylinders 31. When the rods 33 of cylinders 31 are retracted to the magnetic stop points via the magnetic switches, the fill valves 30 automatically close. The volumetric cylinders 31 are now filled completely with the propellant slurry and ready to cast the rocket motors.

The stations 13 are now rotated 90° in either direction via turntable 12, motor 57 and control panel 58 to bring chambers 17 to the casting area and are locked in this position. Of course, chambers 17 are retained in an upright vertical position by having their bottom walls 80 positioned on centering members 16 and by being grasped by spring clamps 18 at their upper ends. Hydraulic cylinders 67 are now activated to raise the side wall 64 which is at the casting area. Since they are hollow and open at the top, the upper ends of chambers 17 enter the open end of cast heads 38 to a point slightly above the bottom of plate 44 of funnel 41 (see line 17a in FIG. 6). Of course, any suitable point within heads 38 may be used. Bladders 47 are now inflated via air lines 48 to create a seal between the outer wall of chambers 17 and the interior wall or bore 39 of cast heads 38. The amount of air is of course predetermined and controlled via valve 48a.

Vacuum is now initiated in all the cast heads 38 prior to opening cast valves 37. Of course, such operation is preferably automatic and cast valves 37 will not open unless the desired vacuum is achieved. After the desired vacuum is reached within cast heads 38, the cast valves 37 open and pressure is applied to the pistons 32 of cylinders 31. When the pistons 32 reach a pre-set stop point, the cast valves 37 are closed. Again, such operation may be automatic, using any suitable signaling and operating means well known to the artisan, such as the aforementioned magnetic switches. The speed of the casting operation may also be pre-set and controlled by suitable flow-control valves.

After the closing of the cast valves 37, the chambers 17 may rest under vacuum for a desired predetermined dwell period. The volumetric fill cylinders 31 are now activated and rods 33 are extended to fill the chambers 17 with the propellant slurry by means of rods 33 pushing downwardly on free-floating pistons 32, which thereby pushes the slurry into chambers 17. At this point, the pipe sections 29 are blocked up and filled with slurry because of valves 30 so that the slurry pushed by pistons 32 bypasses sections 29 and passes valves 37 to enter and fill chambers 17, the amount of slurry being metered as discussed previously. Preferably, chambers 17 are filled to a point which will be discussed hereinbelow with respect to FIG. 12.

During the entire cast and fill operation, additional chambers 17 are placed on table 12 in a position immediately before the casting area. Upon completion of the aforementioned vacuum dwell period, the vacuum is slowly released via outlets 50. The bladders 47 are deflated via air lines 48 and the cylinders 67 are retracted to thereby lower chambers 17. As the chambers 17 are disengaged from the casting heads 38 and subsequent to clearing the casting heads 38, the drip tray assembly 53, normally in the FIG. 7 position, is moved to the FIG. 1 position via actuation of arms 56. The drip trays 54 thereon thus catch any dripping excess propellant slurry from cast heads 38 and can later be removed for cleaning.

The table 12 is once again rotated 90° to bring the next set of chambers 17 into the casting area. At this time the filled chambers 17 move 90° from the cast position to an idle position (the side of table 12 not visible in FIG. 1). Upon casting completion of this second set of chambers 17 and the loading of an additional set of chambers 17, a third cast cycle is initiated.

At this point, the first set of cast chambers 17 move through a predetermined angle, such as 90°, into the FIG. 2 position. As can be seen, core rods 71 are held in core rod holders 70 in a position directly above chambers 17. That is, the longitudinal axes of rods 71 are aligned with the central longitudinal axes of the filled chambers 17. These holders 70 are supported by cylinders 79 (FIG. 8) in preparation for core displacement. The means for holding rods 71 have been previously described. The cylinders 79 are normally retracted to permit table 12 to rotate. Again, suitable flow-control valves or the like may be used to control the speed of extension and retraction of cylinders 79.

Upon completion of rotation of table 12, propellant displacement begins. The core rod holders 70 are moved downwardly via cylinders 79, thus bringing core rods 71 down into the propellant slurry within chambers 17. It is to be understood that, if desired, the core rods 71 may be inserted just after the initial loading of the chambers 17 in stations 13 of table 12 prior to entering the cast poaition. The manner to accomplish the same is similar to that previously described.

Upon completion of the stroke of hydraulic cylinders 79 and when a predetermined hydraulic pressure is reached, the cylinders 79 may be retracted. A suitable dwell period may also be provided, if desired. The lower ends of core rods 71 enter depressions 81 in the bottom walls 80 of chambers 17 which thus properly aligns the rods 71 within both the chambers 17 and the propellant slurry therein. The rods 71 are released from the spring-biased heads 72 of holders 70 by means of heads 72 striking the tops of chambers 17 on the downstroke.

After cylinders 79 are retracted, table 12 is again rotated and the completed chambers 17 may move to a separate unload position. The chambers 17 are then manually removed from clamps 18 and transferred to a suitable curing station. Empty chambers 17 may then be placed within clamps 18 and the cycles repeated. Optionally, the unloading of the chambers 17 may take place in the displacement position when core rods 71 are inserted subsequent to casting.

Although the foregoing has described certain operations with reference to automatic control, obviously such operations may be carried out manually, if desired. However, automatic operation is desired for efficiency and conservation of time and manpower.

At the casting station, the chambers 17 are preferably filled with the propellant slurry to a level at least slightly below the junction of sleeve member 82 (see FIG. 12). In this manner, when the core rods 71 are inserted into the slurry, the slurry flows upwardly above the heads 72 thereof between grooves 73 and the inner cylindrical walls of chambers 17. When the chambers 17 are prepared for use as a rocket motor, i.e., after the propellant slurry is solidified by curing, the rods 71 are removed and any portions of the solidified slurry above the level desired within chambers 17 may be removed, as by breaking off. The core formed within the chambers 17 may then be machined to a suitable shape for proper burning of the rocket motor. Suitable nozzles, control means, fins, etc., are then added to chambers 17 to convert the chambers 17 into finished rocket motors.

The prevention of air gaps or the like in the propellant is important for the subsequent burning action that will take place within the rocket motor when it is fired. The nozzles that are subsequently provided on the completed rocket motors are set up to permit a certain volume flow of gases upon the burning of the propellant — if air gaps are present in the propellant, the nozzles couldn't handle the increased rate of burning and may prematurely explode. Of course, this is extremely undesirable.

The proper formation of the bores within the rocket motors is also important, since such cylindrical bores give a particular square-inches of burning area to the motors and provide flow paths for the gases. The propellant acts as an insulator on the chambers themselves — e.g., the chambers 17 may only be thirty one-hundredths of an inch in wall thickness; as the propellant burns within chambers 17 about the bores therein, the thickness of the solidified propellant itself helps to prevent heat from reaching the chamber walls.

It has been found that the production of rocket motors in accordance with the teachings of my invention has brought about a considerable reduction in manpower together with the formation of rockets that burn more efficiently. For example, 1,100 rocket motors were manufactured in accordance with the teachings of my invention. Out of this, only 1 percent or so were defective; approximately 22 percent of an identical number were found to be defective using known prior art manufacturing methods and equipment.

It is to be understood that while the apparatus and method herein described constitute preferred and/or exemplified embodiments of the invention, the invention is not to be limited thereto for it will be evident to those skilled in the art that numerous changes and modifications may be made in the details involved without departing from the scope and spirit of my invention, which is to be construed as broadly as the following claims may allow.

I claim as my invention:

1. Apparatus for forming propellant-containing rocket motor chambers comprising:

a selectively rotatable turntable;

motive means operatively engaging said turntable for selectively rotating said turntable in a generally horizontal plane;

rocket motor chamber-retaining means associated with said turntable for retaining said chambers in a generally vertical position with respect to said turntable, thereby forming a plurality of rocket motor chamber-retaining stations thereon;

manifold means adapted to selectively engage said chambers in a fluid-tight manner and adapted to receive therein a solidifiable propellant slurry and deliver a selective portion of said slurry to each of said rocket motor chambers at said rocket motor chamber-retaining stations;

vacuum-forming means associated with both said manifold means and said chambers when said chambers are in fluid-tight communication with said manifold means for forming a vacuum therein prior to filling said chambers with said slurry; and chamber bore-forming means adapted to selectively enter each of said chambers to thereby form a central generally cylindrical bore therein extending vertically longitudinally of said chambers, said chamber bore-forming means including a plurality of core rod holder means adapted to retain therein a plurality of elongated core rods generally cylindrical and of generally uniform diameter, said holder means being adapted to retain said core rods in a position whereby the central axes of said rods are vertically aligned, and means operatively engaging said holder means for selectively moving said core rod holder means downwardly with respect to said turntable.

2. The apparatus of claim 1 wherein said rocket motor chamber-retaining means includes chamber alignment means associated with said turntable for vertically aligning said chambers on said turntable, and resilient means on said turntable adapted to releasably grasp each of said chambers and hold said chambers in said vertical position on said turntable.

3. The apparatus of claim 1 wherein said manifold means includes a first manifold section adapted to operatively engage a source of supply of said slurry, a plurality of pipe sections in fluid communication with said first manifold section, each of said pipe sections being associated with each of said stations, a propellant slurry casting head coupled to each of said pipe sections and in fluid-tight communication therewith, and volumetric cylinder means operatively engaging each of said casting heads and in fluid-tight communication therewith for delivering a preselected amount of said slurry to each of said chambers.

4. The apparatus of claim 3 wherein said casting head includes a central bore having an inner diameter slightly greater than the outside diameter of said chambers, for receiving the upper ends of said chambers therein.

5. The apparatus of claim 4 including propellant slurry elongated strand-forming means associated with each of said casting heads for forming elongated strands of said slurry when said slurry is delivered to chambers engaged by said casting heads.

6. The apparatus of claim 5 wherein said strand-forming means includes a seat formed in the upper portion of each of said casting heads, and a funnel-like member resting on said seat, said member being open at its upper end and being generally conically tapered downwardly and having a perforated plate closing off its lower end.

7. The apparatus of claim 5 wherein said vacuum-forming means includes an air outlet associated with each of said casting heads communicating with the interior thereof, and a selectively inflatable and deflatable bladder disposed in a groove extending about the inner walls of said casting heads.

8. The apparatus of claim 3 including drip pan means adapted to be selectively moved from a first position remote from said casting heads to a second position into engagement with the open ends of said casting heads when said chambers are disengaged therefrom.

9. The apparatus of claim 1 wherein said core rod holder means includes a spring-biased core rod holder head having a notched inner surface for receiving therein the grooved head of a core rod.

* * * * *